United States Patent
Shikimachi

(10) Patent No.: US 8,306,733 B2
(45) Date of Patent: Nov. 6, 2012

(54) ROAD MAP DATA LEARNING DEVICE AND METHOD FOR DETECTING AND LEARNING NEW ROAD

(75) Inventor: Takeshi Shikimachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 447 days.

(21) Appl. No.: 12/659,135

(22) Filed: Feb. 26, 2010

(65) Prior Publication Data

US 2010/0250124 A1   Sep. 30, 2010

(30) Foreign Application Priority Data

Mar. 24, 2009   (JP) .................. 2009-72528

(51) Int. Cl.
 G01C 21/30 (2006.01)
 G01C 21/34 (2006.01)
 G08G 1/123 (2006.01)
(52) U.S. Cl. ......... 701/408; 701/410; 701/414; 701/533
(58) Field of Classification Search .................. 701/530, 701/410
 See application file for complete search history.

(56) References Cited

U.S. PATENT DOCUMENTS

| | | | | |
|---|---|---|---|---|
| 6,125,323 | A * | 9/2000 | Nimura et al. | 701/410 |
| 7,890,251 | B2 * | 2/2011 | Nakae et al. | 701/416 |
| 2005/0102098 | A1 * | 5/2005 | Montealegre et al. | 701/209 |
| 2008/0065327 | A1 | 3/2008 | Sobue | |
| 2008/0120171 | A1 * | 5/2008 | Ikeuchi et al. | 705/13 |
| 2008/0154489 | A1 * | 6/2008 | Kaneda et al. | 701/201 |
| 2010/0063727 | A1 * | 3/2010 | Umezu et al. | 701/208 |
| 2010/0114975 | A1 | 5/2010 | Kanematsu et al. | |

FOREIGN PATENT DOCUMENTS

| | | |
|---|---|---|
| JP | B2-2778374 | 5/1998 |
| JP | A-11-161157 | 6/1999 |
| JP | A-2000-009482 | 1/2000 |
| JP | A-2001-74485 | 3/2001 |
| JP | A-2002-054934 | 2/2002 |
| JP | A-2005-172578 | 6/2005 |

(Continued)

OTHER PUBLICATIONS

Office Action mailed on Mar. 29, 2011 in the corresponding Japanese Patent Application No. 2009-072528 (English translation enclosed).
Office Action mailed Mar. 29, 2011 in the corresponding Japanese Patent Application No. 2009-072528 (and English translation).

(Continued)

Primary Examiner — Ryan Zeender
Assistant Examiner — Ariel Yu
(74) Attorney, Agent, or Firm — Posz Law Group, PLC

(57) ABSTRACT

A new road detection unit detects a new road according to a travel locus of a vehicle and road map data of a road map data learning device. The new road is not included in the road map data. A road learning unit learns the new road, which is detected by the new road detection unit, as a learned road being functional additionally to the road map data. A storage device stores a feature of an erroneous new road, which is erroneously detected by the new road detection unit, as learning-prohibited pattern information. The road learning unit restricts learning of a new road detected by the new road detection unit when the feature of the new road detected by the new road detection unit coincides with the learning-prohibited pattern information stored in the storage device.

8 Claims, 4 Drawing Sheets

FOREIGN PATENT DOCUMENTS

| | | |
|---|---|---|
| JP | A-2006-64632 | 3/2006 |
| JP | A-2007-120949 | 5/2007 |
| WO | WO 2010/040382 | 4/2010 |

OTHER PUBLICATIONS

Search Report dated Jul. 27, 2010 in corresponding GB application No. 1004852.8.

* cited by examiner

ROAD MAP DATA LEARNING DEVICE AND METHOD FOR DETECTING AND LEARNING NEW ROAD

CROSS REFERENCE TO RELATED APPLICATIONS

This application is based on and incorporates herein by reference Japanese Patent Application No. 2009-72528 filed on Mar. 24, 2009.

FIELD OF THE INVENTION

The present invention relates to a road map data learning device configured to learn a new road based on a travel locus of a vehicle. The present invention relates to a method for detecting and learning a new road.

BACKGROUND OF THE INVENTION

For example, Japanese Patent Gazette No. 2778374 discloses a device configured to generate data of a new road, which is not included in road map data, based on a travel locus of a vehicle. The device is further configured to store the generated data of the new road. Detection of a travel locus of a vehicle certainly causes an error. Therefore, when data of a new road is generated based on a travel locus of a vehicle, as disclosed in Japanese Patent Gazette No. 2778374, the generated data of the new road is not necessarily correct. Therefore, it is conceived that a user may confirm whether the generated data of the new road is erroneous, and the user may delete the generated data of the new road when determining the generated data to be erroneous, as a result of the confirmation.

However, even when the user deletes the generated data of the new road, erroneous learning may be performed again to generate data. In this case, generate data of the new road caused by the erroneous learning needs to be further deleted. Consequently, the user may be annoyed by repeatedly generated unnecessary data. In addition, since erroneous data of the new road exists, a correct new road, which is similar to the erroneously detected new road, may be determined to be already learned. In this case, learning of the correct new road may not be performed.

SUMMARY OF THE INVENTION

In view of the foregoing and other problems, it is an object of the present invention to produce a road map data learning device configured to restrain repeated erroneous learning of an new road. It is another object of the present invention to produce a method for detecting and learning a new road.

According to one aspect of the present invention, a road map data learning device comprises a new road detection unit configured to detect a new road based on a travel locus of a vehicle and road map data, the new road being not included in the road map data. The road map data learning device further comprises a road learning unit configured to perform learning of a new road detected by the new road detection unit as a learned road being functional additionally to the road map data. The road map data learning device further comprises a storage device configured to store a feature of an erroneous new road, which is erroneously detected by the new road detection unit, as learning-prohibited pattern information. The road learning unit is further configured to restrict the learning of a new road detected by the new road detection unit when a feature of the new road coincides with the learning-prohibited pattern information stored in the storage device.

According to another aspect of the present invention, a method for detecting and learning a new road comprises detecting a new road based on a travel locus of a vehicle and road map data, the new road being not included in the road map data. The method further comprises storing a feature of an erroneously detected new road as learning-prohibited pattern information. The method further comprises learning a detected new road as a learned road, which is functional additionally to the road map data, when a feature of the detected new road does not coincide with the stored learning-prohibited pattern information. The method further comprises restricting learning of a detected new road when a feature of the detected new road coincides with the stored learning-prohibited pattern information.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
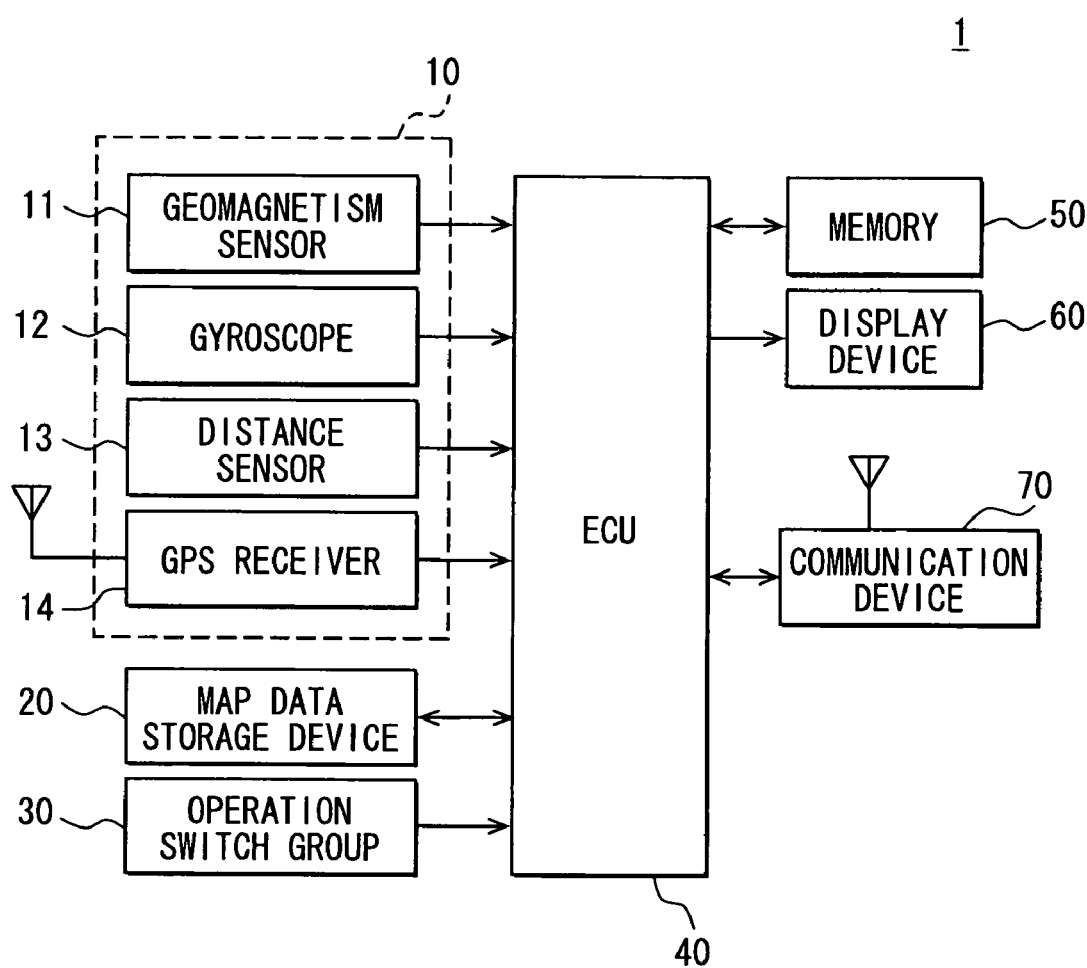
FIG. 1 is a block diagram showing an in-vehicle navigation device 1 having a function of a road map data learning device.

As follows, embodiments of the present invention will be described with reference to drawings. FIG. 1 is a block diagram showing an in-vehicle navigation device 1 having a function of a road map data learning device. The in-vehicle navigation device 1 includes a position detecting unit 10, a map data storage device 20, an operation switch group 30, a memory 50, a display device 60, a communication device 70, and the ECU 40. The ECU 40 is connected with the above devices. The ECU 40 includes generally-known electronic components such as a CPU, a ROM, a RAM, an I/O unit, which are connected via a bus line. For example, the ROM stores a program executed by the ECU 40. The CPU and the like execute a predetermined processing according to the program.

The position detecting unit 10 includes a geomagnetism sensor 11, a gyroscope 12, a distance sensor 13, a GPS receiver 14, and the like. The geomagnetism sensor 11 detects an absolute direction of a vehicle. The gyroscope 12 detects a relative bearing of the vehicle. The distance sensor 13 detects a travel distance of the vehicle. The GPS receiver 14 is a component of a global positioning system (GPS) for measuring the position of the vehicle based on electric wave from a satellite. Each of the components 11, 12, 13, 14, may be a generally-known device. Each of the components 11, 12, 13, 14 has an error caused by difference in character. Therefore, the components 11, 12, 13, 14 operate so as to complement each other. In consideration of detection accuracy, the position detecting unit 10 may include a part of the components 11, 12, 13, 14, and may additionally include a rotation sensor of a steering wheel, a vehicle speed sensor of each driving rolling wheel, and the like (not shown).

The map data storage device 20 includes a readable and writable storage medium such as a hard disk (not shown). The storage medium stores the digital road map data. The digital road map data has generally-known data structure including links and nodes specifying a road. The map data storage device 20 outputs various data, which is contained in the digital road map data stored in the storage medium, to the ECU 40. The operation switch group 30 includes an operation device such as a mechanical switch located around the display device 60, a touch sensor integrated with the display device 60, and/or the like. The memory 50 is a rewritable storage medium such as an EEPROM. The memory 50 functions as a storage device and stores a learning-prohibited pattern information mentioned later. The memory 50 temporarily stores data of a partial area centering on a region indicated on the display device 60 so as to accelerate a map drawing operation on the display device 60. The temporarily stored data is partial data of the road map data stored in the storage medium of the map data storage device 20. The display device 60 includes a display screen such as a liquid crystal display and/or an organic EL display. The display device 60 has a predetermined map indication region for indicating a road map around the vehicle, a map around the destination, and/or the like. The communication device 70 is for performing a two-way communication with an information center outside the vehicle. For example, the communication device 70 performs the communication via several-gigahertz frequency band, similarly to a cellular phone device. The communication device 70 may have a function to perform a short-range wireless communication (dedicated short range communication: DSRC) and/or a mid-range wireless communication with an exterior. By performing the mid-range wireless-communication, the communication device 70 is capable of communicating with an external communication device of the Vehicle Information and Communication System (VICS).

The CPU executes the program stored in the ROM, and thereby the ECU 40 performs various operations, such as a current position detection operation, a memory operation of the road map data to the memory 50, a map scale change operation, a menu indication and selection operation, a destination setting operation, a route searching operation, a start operation of route guidance, a current position correction operation, a change operation of an indicated screen, and a volume control operation. The current position detection operation is performed to successively detect the current position of the vehicle, in which the in-vehicle navigation device 1 is mounted, according to a signal from the position detecting unit 10 and the road map data stored in the map data storage device 20. The current position is detected by performing, for example, a hybrid navigation including both dead navigation and electric navigation together. The detected current position may be corrected by arbitrarily performing map matching.

Figure 2:
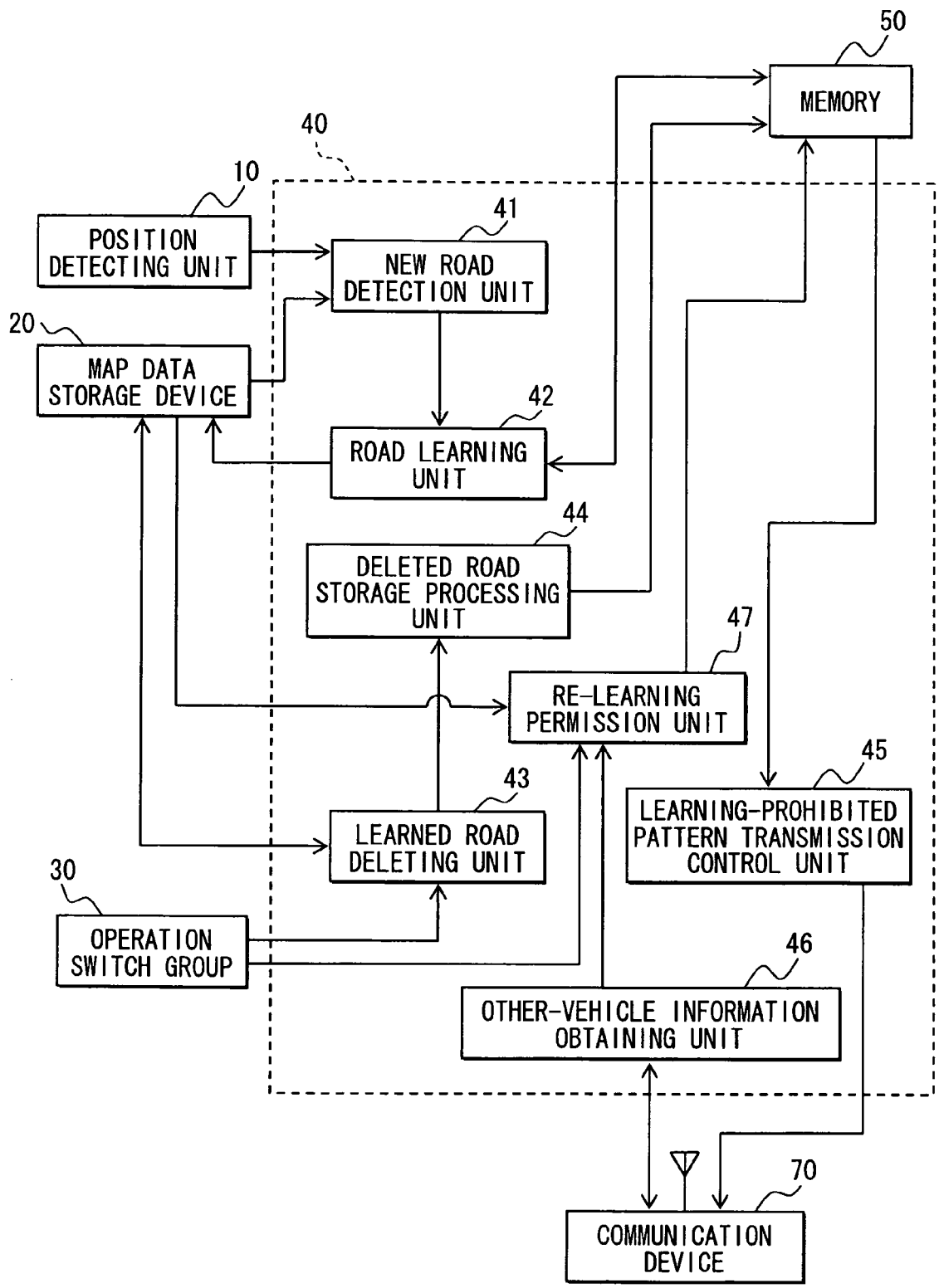
FIG. 2 is a block diagram showing an operation related to detection and learning of a new road performed by an ECU.

The ECU 40 further performs an operation related to detection and learning of a new road. FIG. 2 is a block diagram showing an operation related to detection and learning of a new road performed by the ECU 40. In FIG. 2, a new road detection unit 41 successively generates a travel locus of the vehicle based, on the current position successively detected through the current position detection operation. In addition, the travel locus in a specific period is detected as a new road. In the specific period, it is determined that the current position does not exist on a road included in the road map data. When a new road is detected, feature data of the new road is specified. The feature data includes a link number of a departure link, a departure position, a link number of a return link, and a return position. The departure link is a link in which the current position is located immediately before determination that the current position departs from a road included in road map data. The departure position is a position at which the current position departs from the departure link. The return link is a link on which the vehicle first runs, i.e., the current position first exists, immediately after determination that the current position returns to a road included in road map data. The return position is a position at which the current position returns to the return link. The feature data further includes the shape and the distance of a travel locus after the current position departs from the departure link until the current position returns to the return link. A road learning unit 42 learns a new road detected by the new road detection unit 41 as a learned road, which can be used with a road included in the road map data. It is noted that, the road learning unit 42 does not perform the learning when a feature of the new road coincides with a learning-prohibited pattern.

Figure 3:
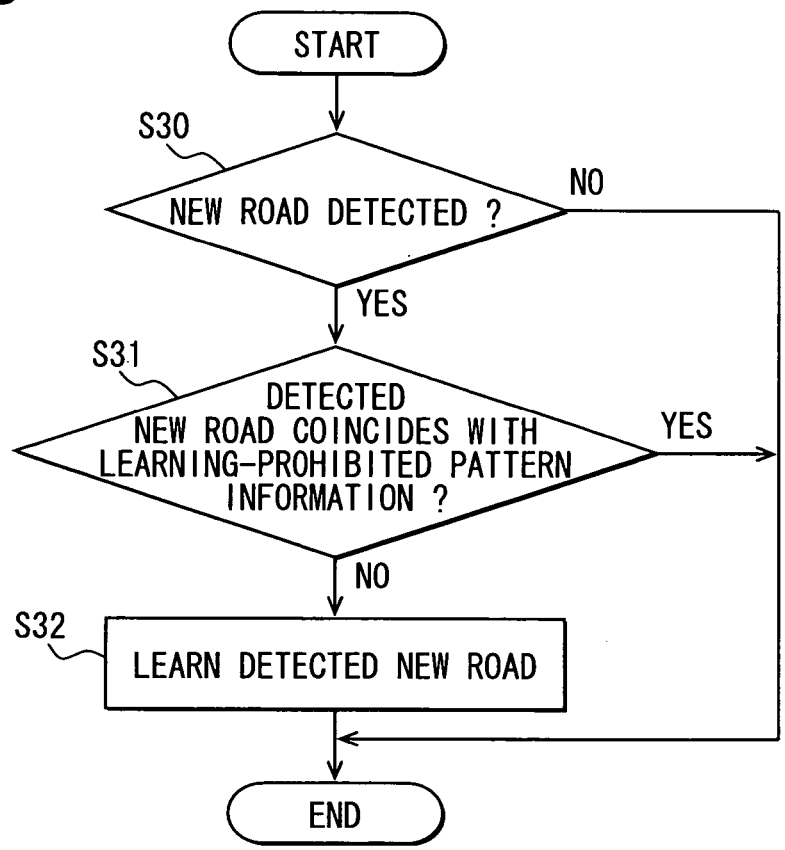
FIG. 3 is a flow chart showing an operation of a road learning unit.

FIG. 3 is a flow chart showing an operation of the road learning unit 42. At step S30, it is determined whether a new road is detected. When step S30 makes a negative determination, the processing is terminated. When step S30 makes a positive determination, the processing proceeds to step S31, at which it is determined whether the detected new road coincides with a learning-prohibited pattern stored in the memory 50. Specifically, the determination in present embodiment is made based on a link condition, a distance condition, and a position condition. The link condition is satisfied when the departure link and the return link of the detected new road respectively coincide with the departure link and the return link of the learning-prohibited pattern information. The length condition is satisfied when a difference between the length of the detected new road and the length of a road of the learning-prohibited pattern information is less than a predetermined length. The position conditions is satisfied when the departure position and the return position of the detected new road are respectively in predetermined ranges of the departure position and the return position of the learning-prohibited pattern information. When all the conditions are satisfied, it is determined that the feature of the new road coincides with the learning-prohibited pattern. In the present embodiment, it is determined whether the feature of the new road coincides with the learning-prohibited pattern based on the three conditions of the link condition, the length condition, and the position condition. It is noted that, the determination may be made based on two of the three conditions or one of the three conditions. When step S31 makes a positive determination, the processing is terminated: By contrast, when step S31 makes a negative determination, the processing proceeds to step S32. At step S32, the new road detected by the new road detection unit 41 is stored as a learned road, which can be used with the road map data. The learned road may be stored in the storage medium storing the road map data. Alternatively, the learned road may be stored in the memory 50 different from the storage medium storing the road map data. When the learned road is stored in the storage medium storing the road map data, data of the learned new road may be added to the road map data, or data of the learned new road may be stored separately from the road map data.

Referring to FIG. 2, when a user performs a deletion operation to delete a learned road via the operation switch group 30, a learned road deleting unit 43 deletes data of the learned road, which is specified by the deletion operation, from the storage medium. The deletion operation of a learned road may be accepted at any time. When a new learned road is stored, a user may be asked whether the learned road is correct or erroneous. In this case, when the user performs an input operation to specify the new learned road to be erroneous, the new learned road may be deleted.

Figure 4:
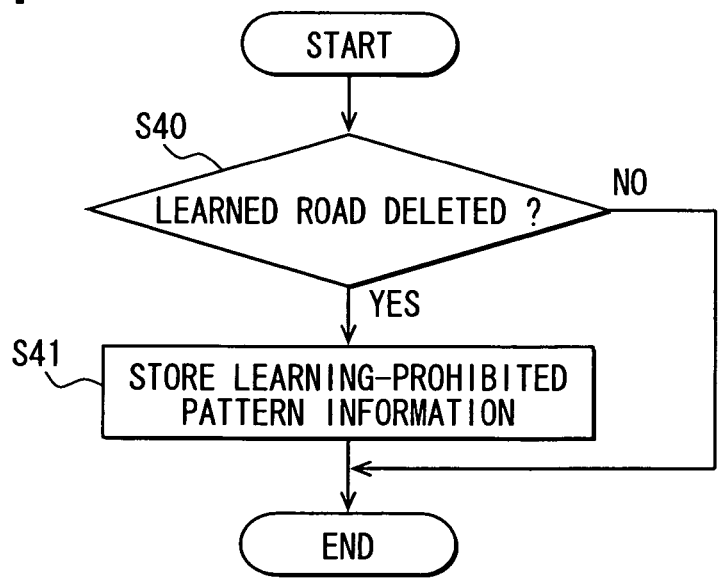
FIG. 4 is a flow chart showing an operation of a deleted road storage processing unit.

As shown in FIG. 4, at step S40, a deleted road storage processing unit 44 (FIG. 2) first determines whether the learned road is deleted by the learned road deleting unit 43. When step S40 makes a negative determination, the processing is terminated. On the other hand, when step S40 makes a positive determination, the processing proceeds to step S41 at which the memory 50 stores a feature of the deleted learned road as learning-prohibited pattern information. In the present embodiment, the learning-prohibited pattern information includes the link number (departure link number) of the departure link, the link number (return link number) of the return link, the departure position (coordinates), the return position (coordinates), and the length of the deleted learned road.

A learning-prohibited pattern transmission control unit 45 transmits the learning-prohibited pattern information stored in the memory 50 to the information center outside the vehicle via the communication device 70. The learning-prohibited pattern information may be transmitted when, for example, new learning-prohibited pattern information is additionally stored in the memory 50. Alternatively, the learning-prohibited pattern information may be transmitted at regular intervals.

An other-vehicle information obtaining unit 46 obtains other-vehicle information from the information processing center via the communication device 70. The other-vehicle information specifies whether the learned road corresponding to the learning-prohibited pattern information stored in the memory 50 it deleted in an in-vehicle navigation device 1 of another vehicle. The other-vehicle information is, for example, the learning-prohibited pattern information of the in-vehicle navigation device 1 of another vehicle. As described above, the learning-prohibited pattern information is transmitted to the information center via the communication device 70. Thus, the information center collects the learning-prohibited pattern information transmitted from many vehicles. Therefore, the learning-prohibited pattern information can be transmitted from the in-vehicle navigation device 1 of a vehicle, and the transmitted learning-prohibited pattern information can be provided to the in-vehicle navigation device 1 of another vehicle.

A re-learning permission unit 47 permits re-learning of a learned road, which is deleted by the deletion operation of a user, when, for example, a learned road, which is correctly learned, is erroneously deleted by the deletion operation. Specifically, the re-learning permission unit 47 deletes the learning-prohibited pattern information stored in the memory 50, thereby to permit re-learning of the learned road, which coincides with the deleted learning-prohibited pattern information. The following conditions (1) to (3) specify conditions for deleting the learning-prohibited pattern information. When at least one of the following condition (1) to (3) is satisfied, the learning-prohibited pattern information is deleted.

The condition (1) is satisfied when it is determined that there is no influence of redevelopment. It is determined whether there is no influence of redevelopment by determining, for example, whether there is no road close to the learned road in the digital road map data stored in the map data storage device 20. When it is determined that there is no road close to the learned road, it is determined that there is no influence of redevelopment. In a redevelopment area, an old road, which had previously existed actually at a location, may become nonexistent due to redevelopment, and a new road may be newly formed close to the location of the old road, which presently became nonexistent, instead of the old road. Presently, data of the old road exists in the road map data. In this case, data of the old road exists close to the learned road in the digital road map data, even though the old road does not actually exist. Consequently, the old road, which does not actually exist, may be recognized as a connected destination of the learned road. On the other hand, when there is no influence of redevelopment, the road connected to the learned road less possibly became nonexistent already. Therefore, in this case, the present learning is considered to be less possibly erroneous learning. Thus, a user's determination is possibly erroneous. Accordingly, when the conditions (1) is satisfied, the learning-prohibited pattern information is deleted.

The conditions (2) is satisfied when a user performs a deletion operation to delete the learning-prohibited pattern information via the operation switch group 30. When a user once determines a learned road to be an erroneously learned road, the user may once perform a deletion operation to delete the learned road. In this case, the learning-prohibited pattern information is generated by the deletion operation. Further, the user may become aware that the deleted learned road is a correctly learned road. In this case, the user can perform a deletion operation to delete the currently generated learning-prohibited pattern information via the operation switch group 30 to satisfy the conditions (2). Thus, re-learning of the once deleted learned road can be enabled.

The condition (3) is satisfied when it is determined that a learned road, which coincides with the learning-prohibited pattern information stored in the memory 50 of the user's vehicle, is not deleted in another vehicle, according to the other-vehicle information obtained by the other-vehicle information obtaining unit 46. When another vehicle maintains a specific road, which is substantially identical with a learned road deleted in the user's vehicle, that is, when the specific road is not deleted in another vehicle, the learned road deleted in the user's vehicle may be erroneously deleted. Thus, the condition (3) is defined.

As described above, the other-vehicle information is the learning-prohibited pattern information of the in-vehicle navigation device 1 in another vehicle. When the other-vehicle information (learning-prohibited pattern information of another vehicle) does not include the learning-prohibited pattern information stored in the memory 50 of the user's vehicle, it is determined that a learned road, which coincides with the learning-prohibited pattern information stored in the memory 50 of the user's vehicle, is not deleted in another vehicle.

Figure 5A:
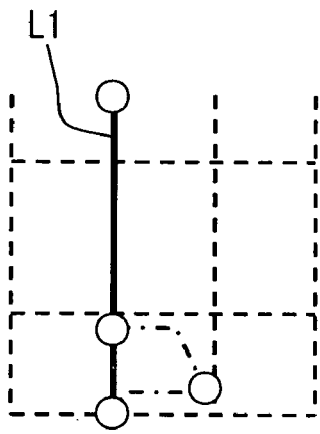
FIGS. 5A to 5C are views each showing an operation effect according to a first embodiment.
Figure 5B:
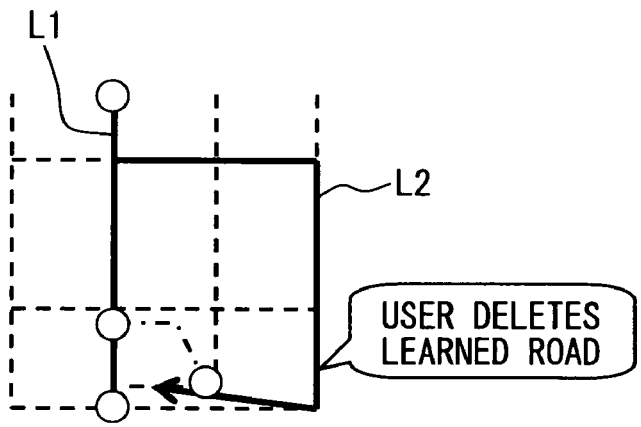
Figure 5C:
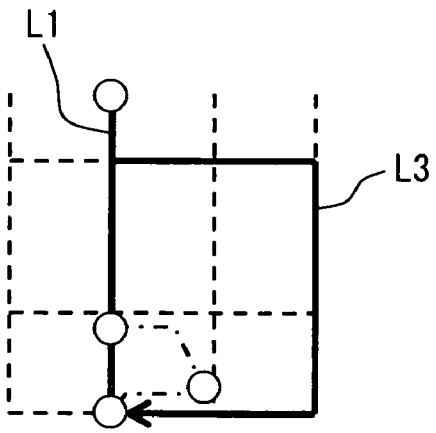

An operation effect of the above-described present embodiment will be described with reference to FIGS. 5A to 5C. In FIGS. 5A to 5C, a solid line L1 shows a road, which exists in the digital road map data. The road shown by the solid line L1 also actually exists. A solid line L2 shows a learned road, which is initially learned. A solid line L3 shows a correctly learned road, which is learned after deletion of the initially learned road shown by the solid line L2. A dashed dotted line shows a road, which exists in the digital road map data and became nonexistent by redevelopment. That is, the road shown by the dashed dotted line does not exist currently. A dashed line shows a road, which is newly formed by redevelopment and still does not exist in the digital road map data. A round mark shows a node.

Before learning a road, in FIG. 5A, data of a road shown by a solid line L1 and a road shown by a dashed dotted line exist in the digital road map data. In the present embodiment, the road learning unit 42 can learn a road, which is not in the digital road map data. A learned road is not necessarily a correct road. In the present embodiment, as shown by the solid line L2 in FIG. 5B, a learned road is connected with a road, which became nonexistent by redevelopment. In this case, when a user determines that the learning is incorrect learning, the user can delete the learned road. When the learned road is deleted by the user, a feature of the deleted learned road is stored in the memory 50 as learning-prohibited pattern information. The road learning unit 42 determines whether a feature of a new road coincides with the learning-prohibited pattern information. When the road learning unit 42 determines that a feature of a new road coincides with the learning-prohibited pattern information, the road learning unit 42 does not learn the new road. Therefore, when the new road detected by the new road detection unit 41 is an erroneously detected new road, repeated learning of the erroneously detected new road can be avoided. In addition, when an erroneously detected new road is learned, learning of a correct new road, which is similar to the erroneously detected new road, may not be performed due to existence of the erroneously detected new road. That is, when data of the learned road shown by the solid line L2 remains, correct learned road shown by a solid line L3 in FIG. 5C may not be learned. In present embodiment, re-learning of the erroneous new road shown by the solid line L2 can be restrained. Consequently, learning of the road shown in solid line L3, which is the correct new road, is facilitated.

In the present embodiment, the re-learning permission unit 47 is further provided for permitting re-learning of a learned road, which was deleted in response to an operation of a user. Therefore, even when a user performs a deletion operation to delete a correctly learned road, re-learning of the correctly learned road can be performed.

Furthermore, in the present embodiment, the learning-prohibited pattern information includes the departure link, the return link, the departure position, the return position, and the length of the deleted learned road. The determination whether to learn a new road is made based on the learning-prohibited pattern information. Therefore, re-learning of the erroneous new road can be restrained with more sufficient accuracy.

One embodiment of the present invention has been described. It is noted that, the present invention is not limited to the above-mentioned one embodiment. The following embodiments are also included in the technical scope of the present invention. In addition to the following embodiments, the present invention may be variously practiced, as long as the practice does not deviate from a gist of the present invention.

For example, in the above embodiment, a user determines whether a learned road is erroneously learned. In addition, when the user deletes the learned road, a feature of the learned road is stored as the learning-prohibited pattern information. It is noted that, the road map data learning device may determine whether a learned road is erroneously learned. In addition, when the road map data learning device determines that a learned road is erroneously learned, the learning-prohibited pattern information may be stored. The road map data learning device may determine that a learned road is erroneously learned when, for example, the learned road is not frequently used. The determination of the frequent usage may be made according to information of usage of another vehicle collected by the information center.

In the above embodiment, the in-vehicle navigation device 1 has the function of the road map data learning device. It is noted that, the road map data learning device need not be mounted in a vehicle and may be provided in an information center.

Summarizing the above embodiments, a road map data learning device includes:

a new road detection unit configured to detect a new road, which is not in road map data, based on a travel locus of a vehicle and the road map data;

a road learning unit configured to perform learning of a new road, which is detected by the new road detection unit, as a learned road, which can be used with the road map data; and a storage device configured to store a feature of the new road, which is erroneously detected, as learning-prohibited pattern information.

The road learning unit is further configured not to learn the new road when the feature of the new road detected by the new road detection unit coincides with the learning-prohibited pattern information stored in the storage device.

In this way, when a new road is an erroneously detected, and when the feature of the erroneously detected new road coincides with the learning-prohibited pattern information, the road learning unit does not learn the new road. Therefore, repeated learning of an erroneously detected new road can be restrained.

When an erroneously detected new road is learned, learning of a correct new road, which is similar to the erroneously detected new road, may not be performed due to existence of the erroneously detected new road. Nevertheless, in the present embodiment, learning of an erroneous new road can be restrained. Thus, learning of a correct new road can be facilitated.

The road map data learning device may further include a learned road deleting unit configured to delete the learned road based on an operation of a user; and a deleted road storage processing unit configured to store the feature of the learned road, which is deleted by the learned road deleting unit, as the learning-prohibited pattern information.

In this way, the learned road, which is determined to be erroneously learned and deleted by the user, is no longer learned, after being deleted by an operation of the user. Therefore, erroneously learned road need not be repeatedly deleted.

The road map data learning device may further include a re-learning permission unit configured to delete the learning-prohibited pattern information on a learned road, which is stored in the storage device, to permit re-learning of the learned road when it is determined that the learned road, which is deleted by the learned road deleting unit, is not exerted with influence of redevelopment.

The learned road, which was deleted by the user, is not necessarily an erroneously learned road, and the learned road it may be deleted based on user's misapprehension. Erroneously learned road may be, for example, primarily caused by learning of a new road in a redevelopment area. In a redevelopment area, an old road, which had previously existed actually at a location, may disappear due to redevelopment, and a new road may be newly formed close to the location of the old 25, road, which does not exist presently, instead of the old road. In this case, data of the old road exists in the road map data. Consequently, a new road may be detected as a road connected to a road, which does not actually exist. Therefore, erroneous learning may be possibly caused in a redevelopment area. In other words, when there is no influence of redevelopment, a possibility of erroneous learning is considered to be low. Therefore, as described above, when it is determined that a road is not exerted with influence of redevelopment, i.e., when it is determined that a road is irrelevant to influence of redevelopment, re-learning of the learned road, which is deleted by the learned road deleting unit, is permitted. In this way, in a case where the user erroneously deleted the learned road even when the learned road is correctly learned, the correctly learned road can be included in the road map data.

The road map data learning device may further include a re-learning permission unit configured to delete the learning-prohibited pattern information stored in the storage device according to an operation of the user so as to permit re-learning of the learned road, which coincides with the learning-prohibited pattern.

In this way, in addition to deletion of the learned road, a user is enabled to delete the learning-prohibited pattern, which is stored in the storage device in response to deletion of the learned road, so as to permit re-learning of the road. When a user once determines a learned road to be an erroneously learned road, the user may once perform a deletion operation to delete the learned road. In this case, the learning-prohibited pattern information is generated by the deletion operation. Further, the user may become aware that the deleted learned road is a correctly learned road. In this case, the user can perform a deletion operation to delete the currently generated learning-prohibited pattern information. Thus, re-learning of the once deleted learned road can be enabled.

The road map data learning device may be mounted in a vehicle.

The road map data learning device may further include:

a transmission unit configured to transmit the learning-prohibited pattern information stored in the storage device to an information processing center located outside of the vehicle;

an other-vehicle information obtaining unit configured to obtain other-vehicle information from the information processing center, the other-vehicle information being related to determination whether the learned road, which coincides with the learning-prohibited pattern information stored in the storage device of the vehicle, is deleted in a road map data learning device of another vehicle; and a re-learning permission unit configured to delete the learning-prohibited pattern information on the learned road so as to permit re-learning of the learned road when determining, based on the other-vehicle information, that the learned road, which coincides with the learning-prohibited pattern information stored in the storage device of the vehicle, is not deleted in another vehicle.

When another vehicle maintains a specific road, which is considered to be substantially identical with the learned road deleted in the vehicle of the user, that is, when the specific road is not deleted in another vehicle, the learned road deleted in the vehicle of the user may be possibly erroneously deleted. Re-learning of the learned road may be permitted by deleting the learning-prohibited pattern information on the learned road when it is determined that the learned road, which coincides with the learning-prohibited pattern information stored in the storage device of the vehicle, is not deleted in another vehicle.

The learning-prohibited pattern information may include a departure link number and a return link number. The road learning unit may determine whether a new road coincides with the learning-prohibited pattern information according to the departure link number and the return link number of the new road as the feature of the new road. In general, different roads may less possibly have the same departure link number and the same return ring number. Therefore, by making the determination according to the departure link number and the return link number, re-learning of an erroneous new road can be restrained with sufficient accuracy.

The determination may be made according to a departure position and a return position instead of the departure link number and the return link number. The learning-prohibited pattern information may include a departure position and a return position. The road learning unit may determine whether a new road coincides with the learning-prohibited pattern information according to the departure position and the return position of the new road as the feature of the new road. In this way, by making the determination according to the departure position and the return position, re-learning of an erroneous new road can be restrained with sufficient accuracy.

The learning-prohibited pattern information may further include a length of the deleted learned road. The road learning unit may determine whether a new road coincides with the learning-prohibited pattern information according to the departure link number, the return link number, and the length of the new road as the feature of the new road.

In this way, in a case where the new road is different from the deleted road in the length, the new road does not coincide with the learning-prohibited pattern, even when the departure link and the return link of the new road are the same as those of the deleted learned road. In a determination according to only the departure link and the return link, a new road may be determined to coincide with the learning-prohibited pattern information and may not be learned erroneously, even though the new road has not been deleted. On the other hand, in the determination according to the departure link, the return link, and the length, such an erroneous condition can be avoided.

The learning-prohibited pattern information may further include the departure position and the return position of the learned road, which has been deleted. The road learning unit may determine whether a new road coincides with the learning-prohibited pattern information according to the departure position and the return position as the feature of the new road, in addition to the departure link number, the return link number, and the length of the new road. In this way, by making the determination further according to the departure position and the return position, re-learning of an erroneous new road can be restrained with sufficient accuracy.

The above structures of the embodiments may be combined as appropriate.

The above processings such as calculations and determinations are not limited being executed by the ECU 40. The control unit may have various structures including the ECU 40 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A road map data learning device comprising:
a new road detection unit configured to detect a new road based on a travel locus of a vehicle and road map data, the new road being not included in the road map data;
a road learning unit configured to perform learning of a new road detected by the new road detection unit as a learned road being functional additionally to the road map data;
a learned road deleting unit configured to delete the learned road according to an operation of a user;
a storage device configured to store learning-prohibited pattern information; and
a deleted road storage processing unit configured to store a feature of a learned road, which is deleted by the learned road deleting unit, as the learning-prohibited pattern information,
wherein the road learning unit is further configured to restrict the learning of a new road detected by the new road detection unit when a feature of the new road coincides with the learning-prohibited pattern information stored in the storage device.

2. The road map data learning device according to claim 1, further comprising:
a re-learning permission unit configured:
to determine whether it is possible that the learned road, which is deleted by the learned road deleting unit, recognizes, as a connected destination, a road, which had previously existed actually and data thereof exists in the road map data, and which became nonexistent due to redevelopment and does not actually exist, based on determination whether the road exists close to the learned road in the road map; and
to delete the learning-prohibited pattern information on the learned road, which is stored in the storage device, to permit re-learning of the learned road, when determining that it is not possible that the learned road recognizes, as the connected destination, the road, which does not actually exist.

3. The road map data learning device according to claim 1, further comprising:
a re-learning permission unit configured to delete the learning-prohibited pattern information stored in the storage device according to an operation of a user so as to permit re-learning of a learned road, which coincides with the learning prohibition pattern.

4. The road map data learning device according to claim 1, wherein the road map data learning device is provided in a vehicle,
the road map data learning device further comprising:
a transmission unit configured to transmit the learning-prohibited pattern information stored in the storage device to an information processing center located outside of the vehicle;
an other-vehicle information obtaining unit configured to obtain other-vehicle information from the information processing center, the other-vehicle information being related to determination whether a learned road, which coincides with the learning-prohibited pattern information stored in the storage device of the vehicle, is deleted in a road map data learning device of another vehicle; and
a re-learning permission unit configured to delete the learning-prohibited pattern information on a learned road so as to permit re-learning of the learned road when determining, based on the other-vehicle information, that the learned road, which coincides with the learning-prohibited pattern information stored in the storage device of the vehicle, is not deleted in another vehicle.

5. The road map data learning device according to claim 1,
wherein the learning-prohibited pattern information includes a departure link number and a return link number, and
the road learning unit is further configured to determine whether a new road coincides with the learning-prohibited pattern information according to the departure link number and the return link number of the new road as the feature of the new road.

6. The road map data learning device according to claim 5,
wherein the learning-prohibited pattern information further includes a length of a deleted learned road, which is deleted, and
the road learning unit is further configured to determine whether a new road coincides with the learning-prohibited pattern information according to the departure link number, the return link number, and the length of the new road as the feature of the new road.

7. The road map data learning device according to claim 6,
wherein the learning-prohibited pattern information further includes a departure position and a return position of the deleted learned road, and
the road learning unit is further configured to determine whether a new road coincides with the learning-prohibited pattern information according to the departure position and the return position, in addition to the departure link number, the return link number, and the length, as the feature of the new road.

8. The road map data learning device according to claim 1,
wherein the learning-prohibited pattern information includes a departure position and a return position, and
the road learning unit is further configured to determine whether a new road coincides with the learning-prohibited pattern information according to the departure position and the return position of the new road as the feature of the new road.

* * * * *